Figure 1:
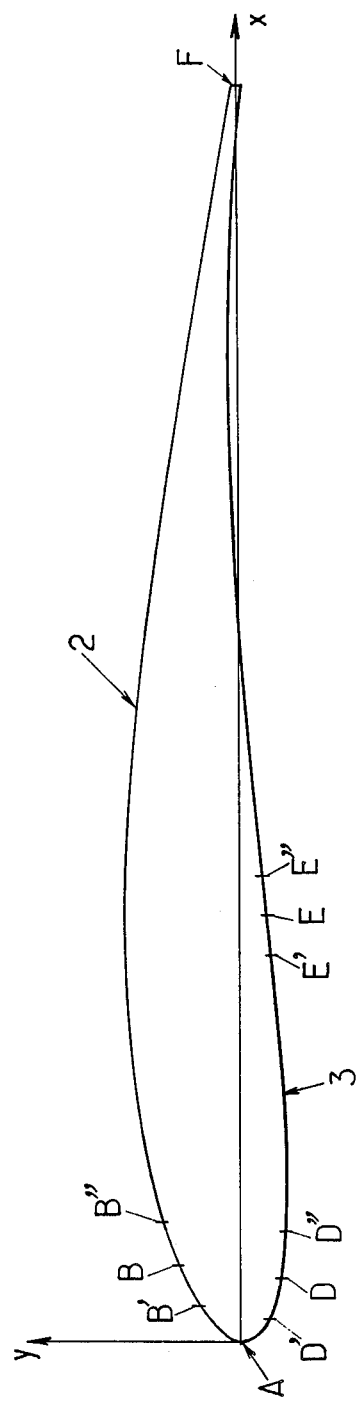

United States Patent [19]

Rodde et al.

[11] Patent Number: 4,773,825

[45] Date of Patent: Sep. 27, 1988

[54] AIR PROPELLERS IN SO FAR AS THE PROFILE OF THEIR BLADES IS CONCERNED

[75] Inventors: Anne M. Rodde; Jean J. Thibert, both of Verrieres le Buisson, France

[73] Assignee: Office National D'Etudes et de Recherche Aerospatiales (ONERA), Sous Bagneux, France

[21] Appl. No.: 930,904

[22] Filed: Nov. 17, 1986

[30] Foreign Application Priority Data

Nov. 19, 1985 [FR] France .................. 85 17080

[51] Int. Cl.$^4$ .............................. B63H 1/26
[52] U.S. Cl. ............................ 416/223 R; 416/242; 416/DIG. 2
[58] Field of Search ............. 416/242, 223 R, 223 A, 416/DIG. 2; 244/35 R, 35 A

[56] References Cited

U.S. PATENT DOCUMENTS 4,413,796 11/1983 Bousquet .................. 416/DIG. 2
4,455,003 6/1984 Hilbig ..................... 244/35 R

FOREIGN PATENT DOCUMENTS 8102557 9/1981 World Int. Prop. O. ........ 244/35 R

Primary Examiner—Robert E. Garrett
Assistant Examiner—Therese Newholm
Attorney, Agent, or Firm—Larson and Taylor

[57] ABSTRACT

The invention relates to improvements to air propellers in so far as the profile of their blades is concerned. The law of evolution of the curvatures of the extrados 2 is the following: the curvature, maximum at the leading edge A, increases first of all rapidly to reach a value of about 4 at the point B at about 4% of the length of the chord, and then decreases regularly to reach a substantially zero value at the trailing edge F. The law of evolution of the curvatures of intrados 3 is the following: the curvature, maximum at the leading edge A, decreases first of all rapidly to reach a value of about 8 at a point D at about 3.5% of the length of the chord, then decreases less rapidly to reach a zero value at a point E situated between 10% and 60% of the length of the chord, decreases further to a slightly negative value and then remains practically constant as far as the trailing edge F.

14 Claims, 10 Drawing Sheets

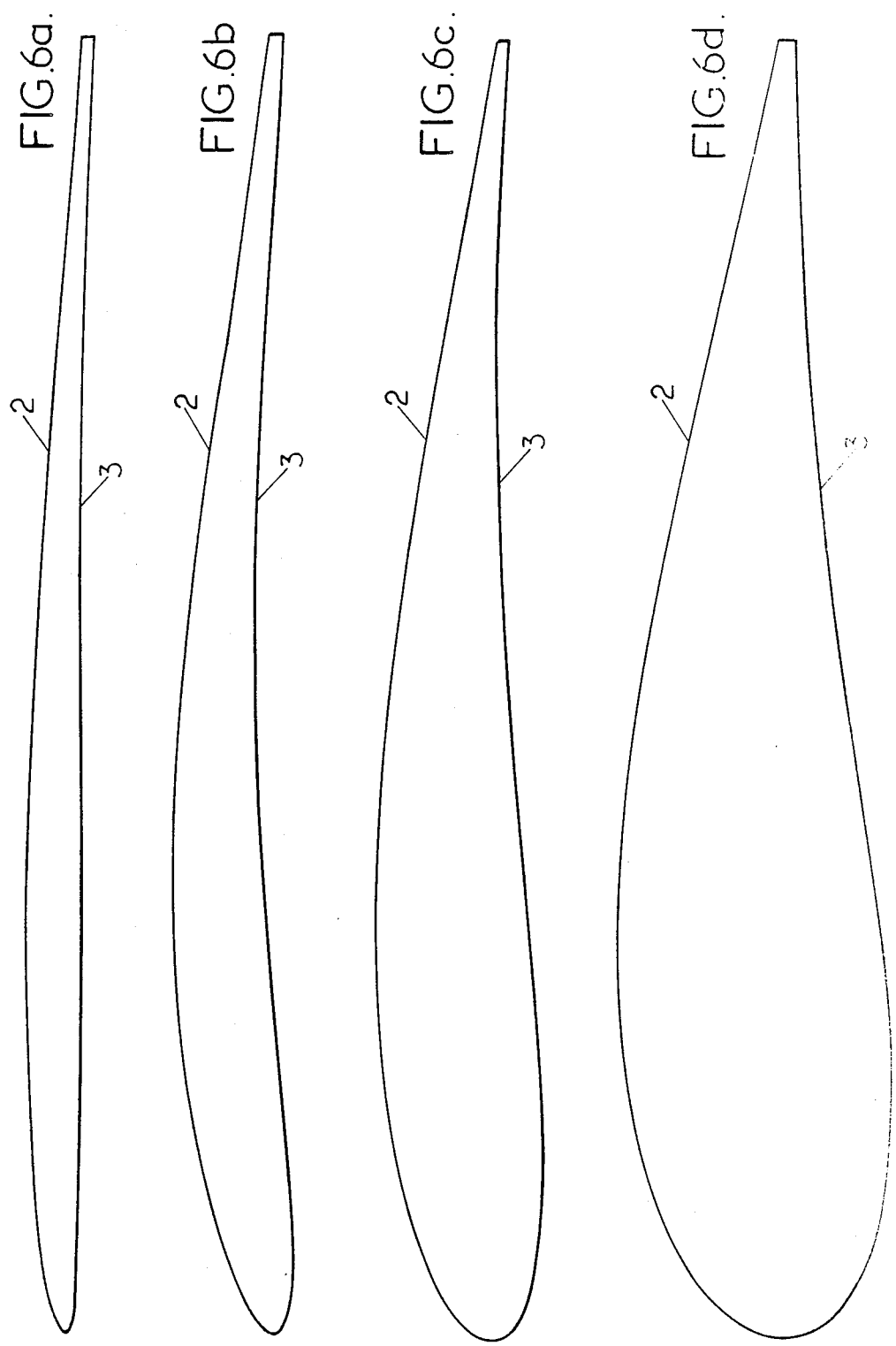

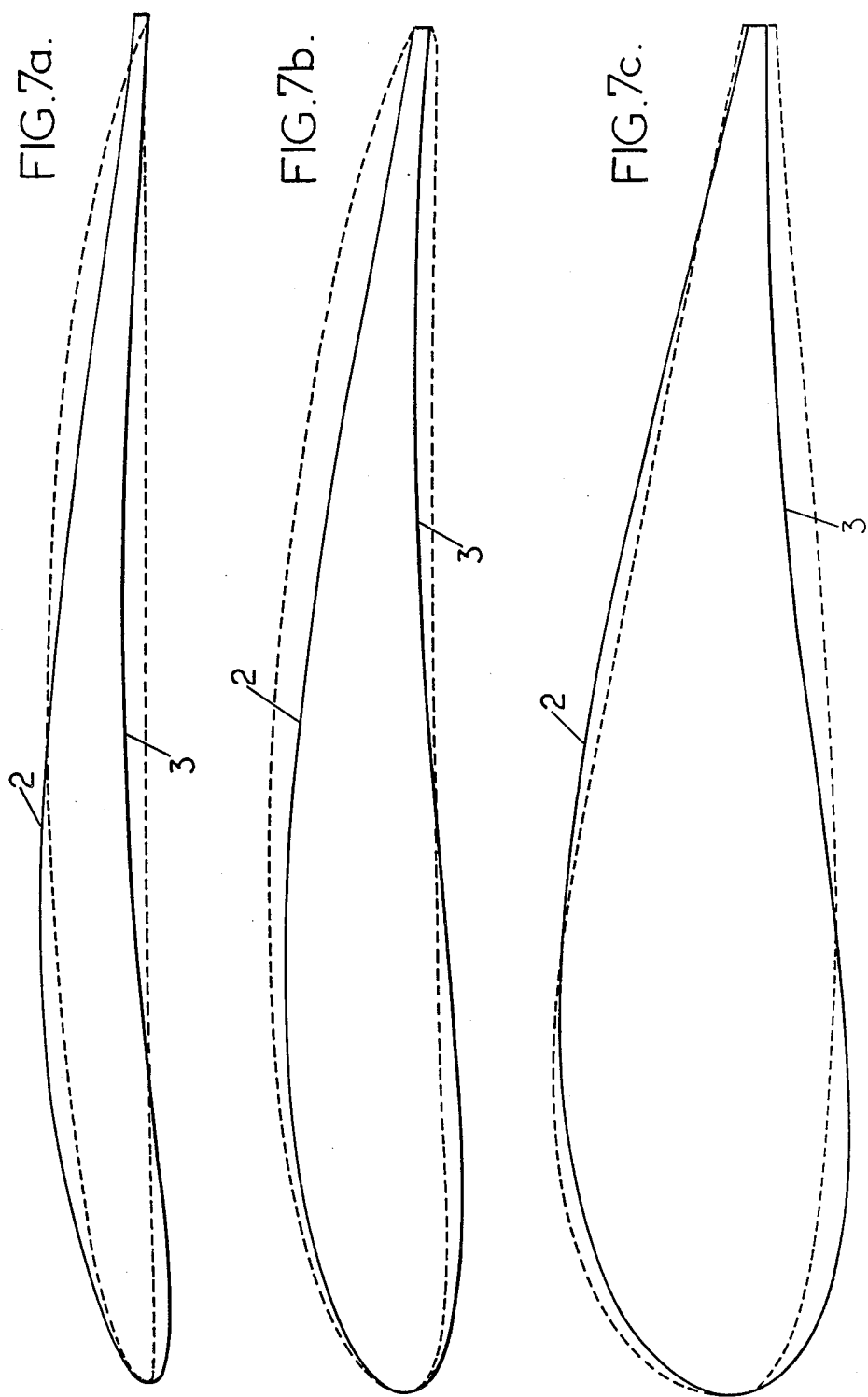

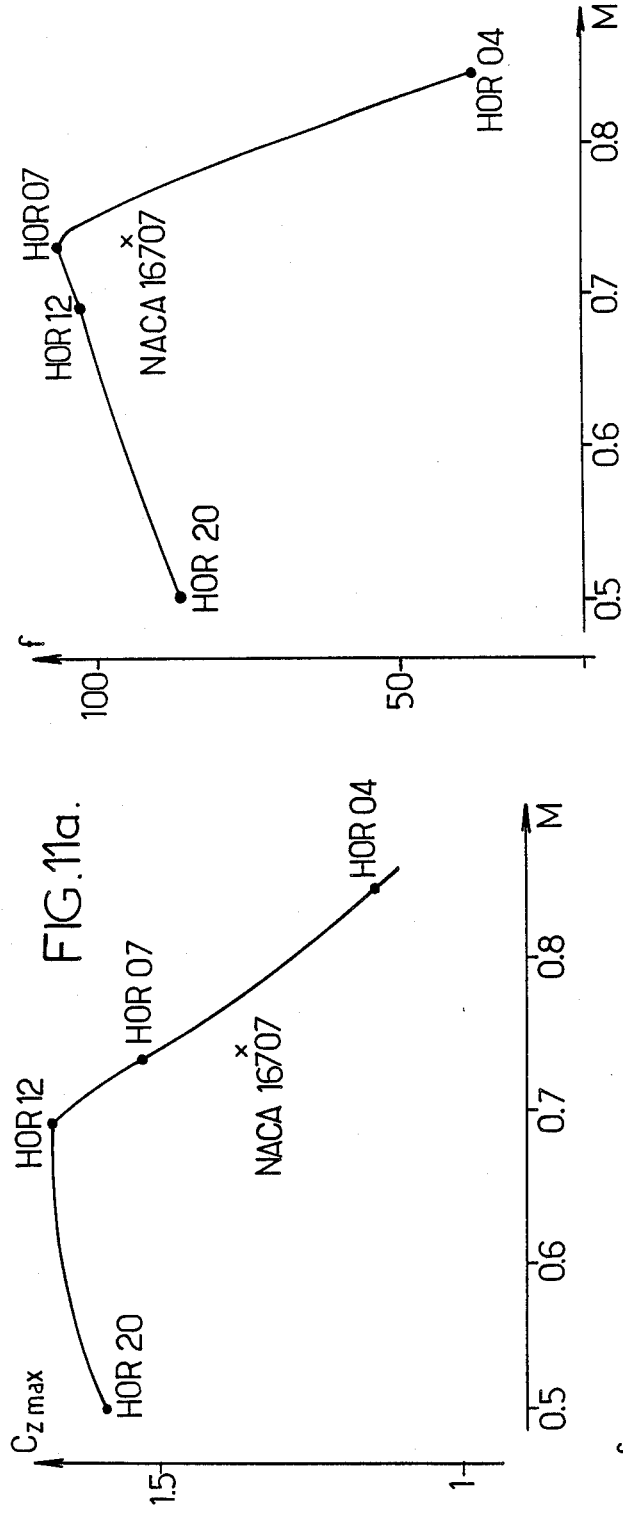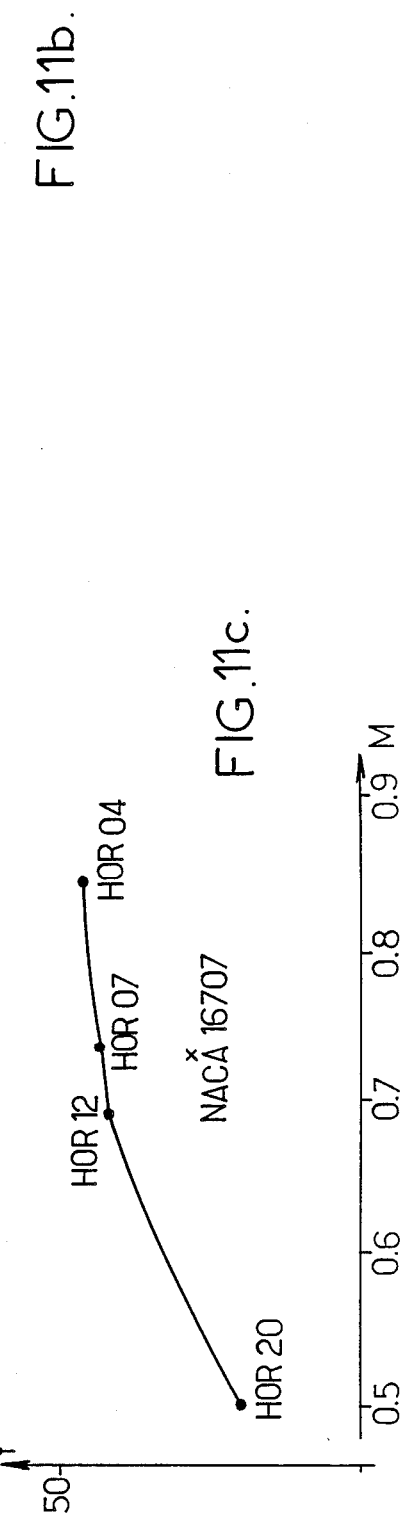

AIR PROPELLERS IN SO FAR AS THE PROFILE OF THEIR BLADES IS CONCERNED

The invention relates to air propellors or airscrews such as propellers for propelling aircraft or propellers for windmills or wind engines and relates to improvements to the profile of their blades.

It is known that the thrust generated by aircraft propellors results from the elementary thrusts generated by each profile, each elementary thrust being given by the formula $$A/2(pC_zlV^2),$$

in which p is the voluminal mass of the air,
$C_z$ is the lift coefficient of the profile considered,
l is the chord of the profile,
V is the relative speed at the level of the profile considered, which speed results from the composition of the speed due to the rotation of the propeller and the speed due to the advance of the aircraft.

At the present time, for a given thrust of the propeller, it is sought
on the one hand, to reduce the noise which is a direct function of the relative speed at the blade end,
and on the other hand, to reduce the weight of the blade, and so to reduce the chord of the profiles forming the blade.

This leads to designing blade profiles which have high lift coefficients, especially in the operating conditions during take off and during climbing of the aircraft.

Furthermore, since the desired cruising speed for aircraft is higher and higher, the relative speed of the end of blade profile may reach relative Mach numbers of 0.8 to 0.9. Under such operating conditions the profile must further have sound behavior, that is to say that no shock wave or lamina separation must occur, so as to limit the drag coefficient of the blades and to obtain good efficiency values for the propeller.

One of the characteristic parameters of the profile is its curvature C at its different points, which curvature is, at each point, equal to the ratio between its chord l and the radius of curvature R of the point considered, namely C=l/R.

It has already been proposed (see the patent No. FR2 510 066 and the review "FLIGHT INTERNATIONAL-BOCCI" November 1976) to reduce the maximum curvature of the leading edge of the profile which reduces the over speeds, on the one hand, on the extrados of the profile during operation at take off and climbing of the aircraft and, on the other hand, on the intrados of the profile during cruising speed operation of the aircraft.

On the other hand, the pressure distribution obtained on these new profiles are close to those existing on conventional NACA 16 profiles, which limits the performances of propellers comprising such profiles.

The present invention provides a profile for blades conferring on the propeller good performances under all operating conditions (take off, climbing and cruising of the aircraft).

The present invention provides then a profile whose lift coefficient is high under the operating conditions at take off and during climbing of the aircraft and whose drag coefficient is low under the operating conditions at the cruising speed of the aircraft.

A profile in accordance with the invention has the qualities also required for application to wind engines for which an excellent efficiency is always desired.

According to the invention, the profile for airscrew blades has a relative thickness related to the chord between 3% and 25%, and extrados of convex shape between the leading edge and the trailing edge, and an intrados first of all of convex shape starting from the leading edge then concave on arriving at the trailing edge, and it is characterized by the following values of the curvatures on the extrados: the curvature, maximum at the leading edge, decreases first of all rapidly to reach a value of about 4 to about 4% of the length of the chord, and then decreases regularly to reach a substantially zero value at the trailing edge; and by the following values of the curvatures on the intrados which is as follows: the curvature, maximum at the leading edge, decreases first of all rapidly to reach a value of about 8 to about 3.5% of the length of the chord, then decreases less rapidly to reach a zero value at a point situated between 10% and 60% of the length of the chord, further decreases to a slightly negative value and then remains practically constant up to the trailing edge.

These values of the curvatures on the extrados, in the region adjacent the leading edge and in the rear part of the profile, allows high values to be obtained of the lift coefficient under operating conditions corresponding to take off and to climbing of the aircraft while reducing the drag coefficient and improving the lift/drag of the profile during this climbing phase.

These values of the curvatures on the intrados, in the region adjacent the leading edge it limits the overspeeds in the vicinity of the leading edge during operation at cruising speed and, in the rear part of the profile, it allows recompressions to be obtained of the flow which avoids the formation of shock waves and the lamina separation phenomena. In addition, the progressive recompression of the flow as far as the trailing edge reduces the drag coefficient during operation at cruising speed.

In an advantageous arrangement of the invention, it is provided that, on each side of the point at 4% of the length of the chord, over a relative distance of 2% on each side of this point, the curvature of the extrados evolves very slightly.

In another advantageous arrangement of the invention, it is provided that, on each side of the point at 3.5% of the length of the chord, over a relative distance of 2% on each side of this point, the curvature of the intrados evolves very slightly.

In yet another advantageous arrangement of the invention it is provided that, on each side of the point of the chord where the curvature of the intrados is zero, over a relative distance of 2% on each side of this point, the curvature of the intrados evolves very slightly.

Preferably, the curvature $C_{max}$ at the leading edge is given by the formula:

$$C_{max} = a_1(e/l) + a_2(e/l)^2 + a_3(e/l)^3 + a_4(e/l)^4$$

e being the thickness of the profile,
l being the chord of the profile,
$a_1$ being a coefficient equal to $+2 \times 10^3$
$a_2$ being a coefficient equal to $-4.576 \times 10^4$
$a_3$ being a coefficient equal to $+3.5 \times 10^5$
$a_4$ being a coefficient equal to $-8.5 \times 10^6$.

Advantageously, the point of the chord where the curvature of the intrados is zero has an abscissa X, reduced to the chord l, given by the formula:

$$(x/l) = 2(e/l) + 0.08$$

e being the thickness of the profile,
l being the chord of the profile.

The invention consists, apart from the arrangements which have been discussed, of certain other arrangements which are preferably used at the same time and which will be more explicitly discussed hereafter.

Figure 2:
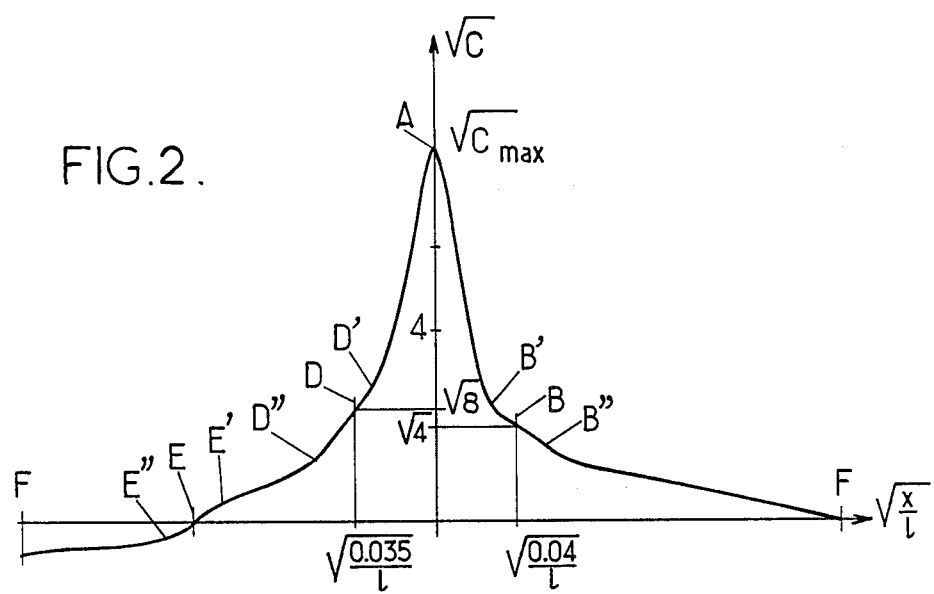
Figure 3:
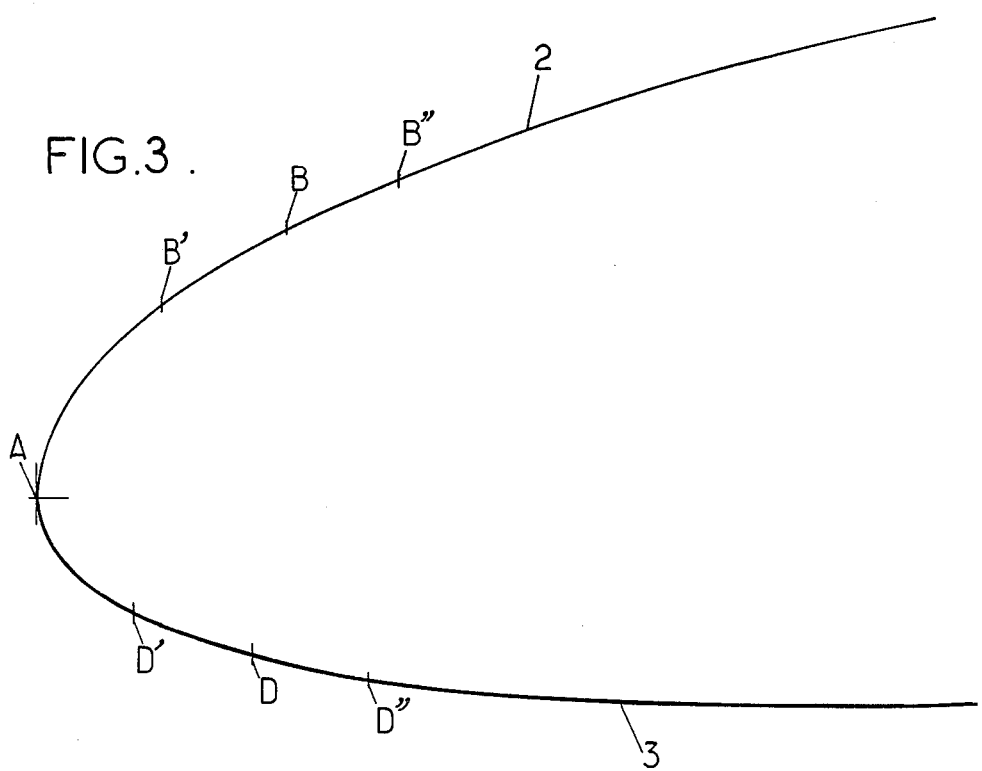
Figure 4:
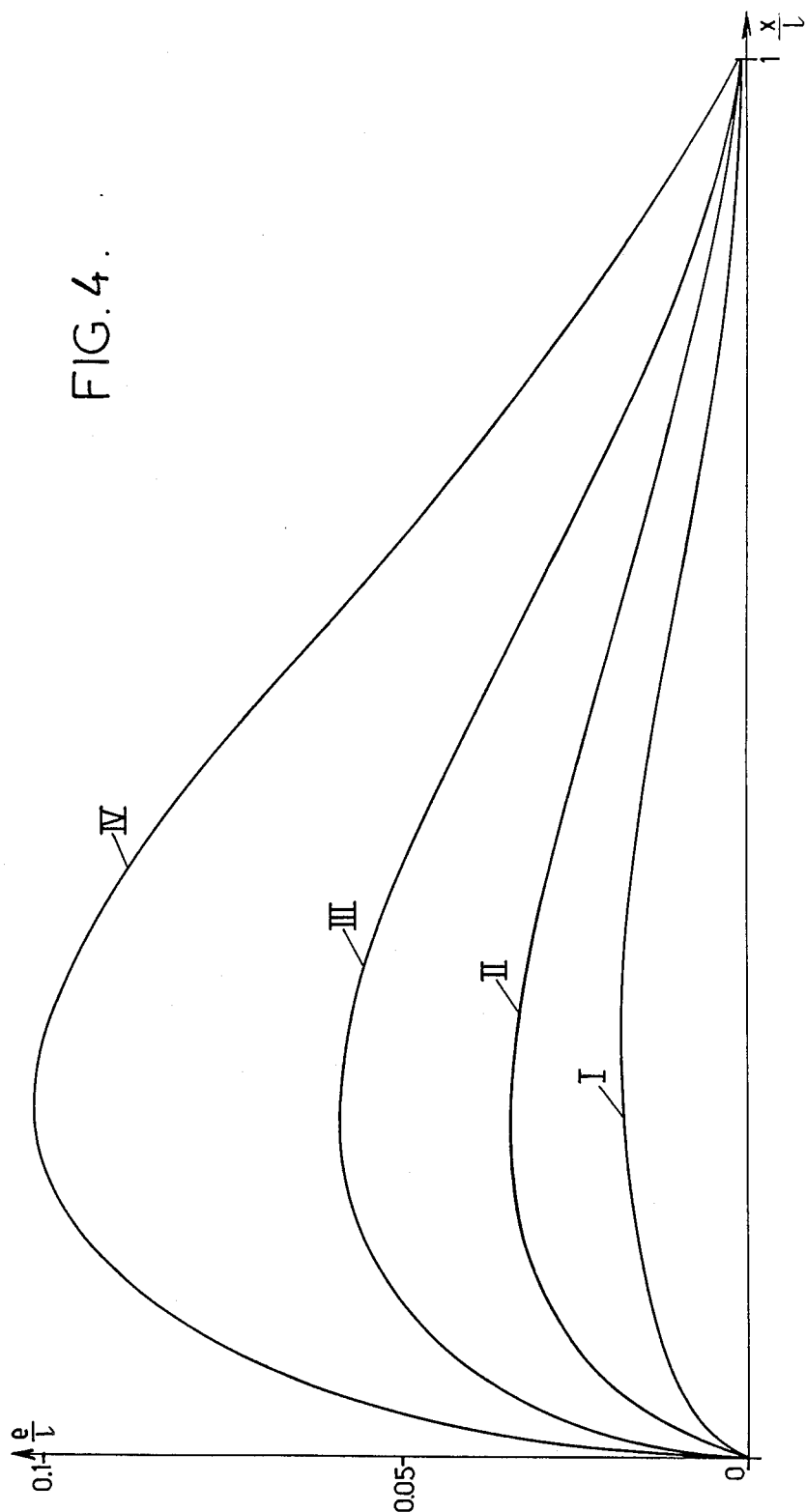
Figure 5:
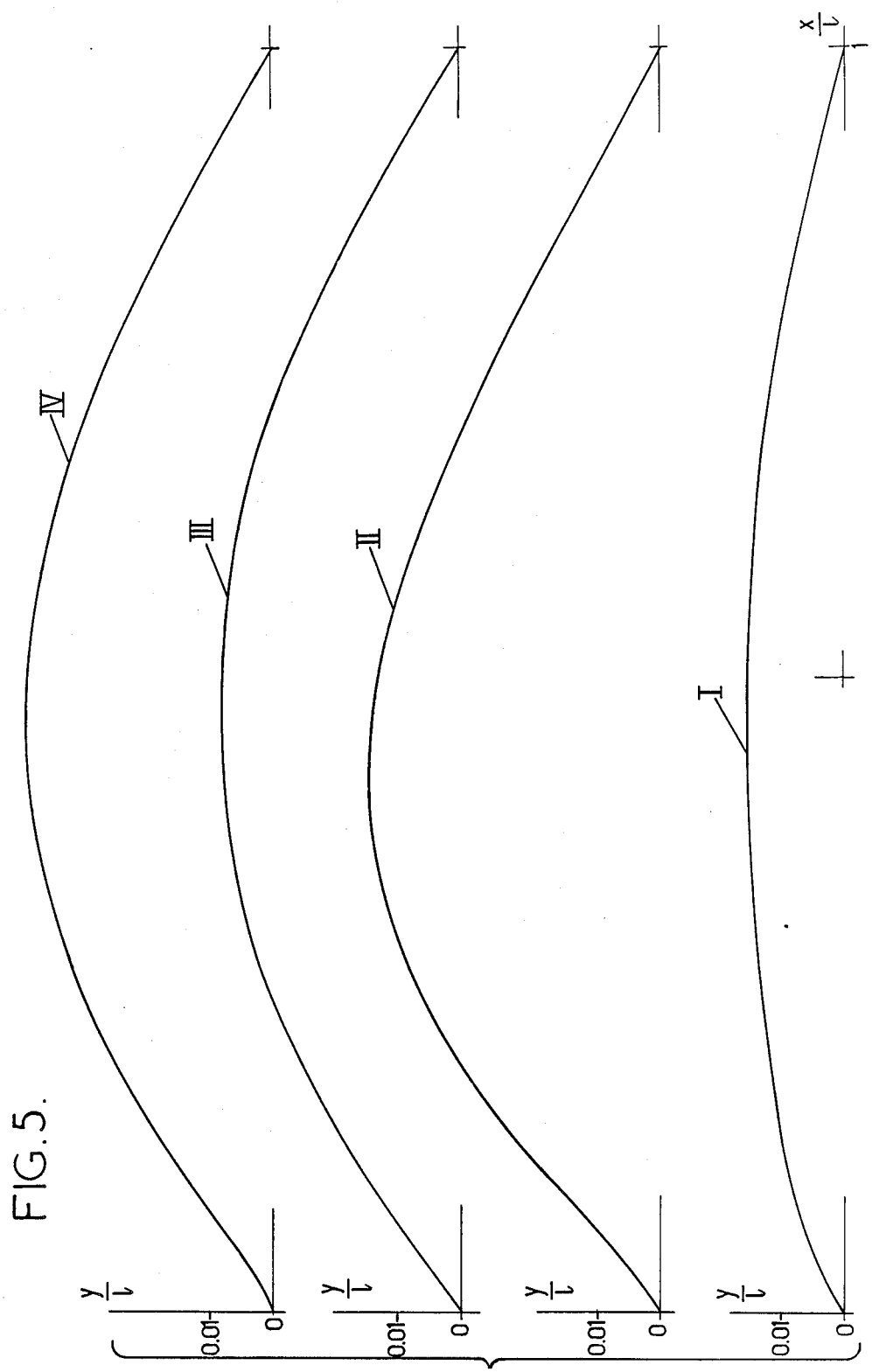
Figure 8A:
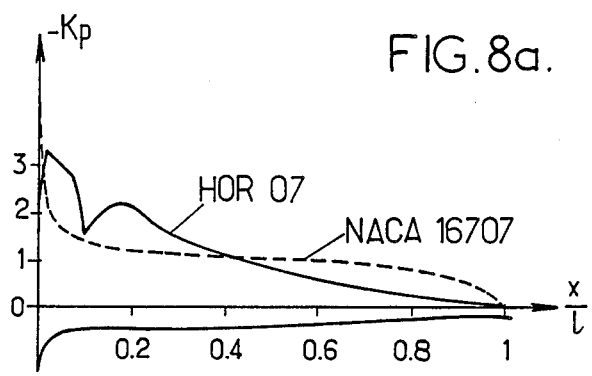
Figure 8B:
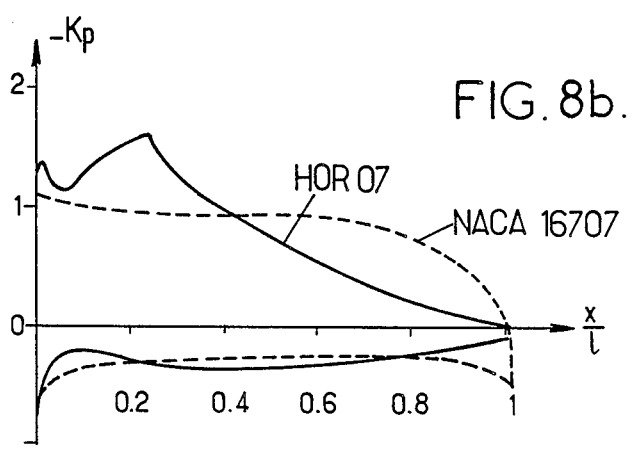
Figure 8C:
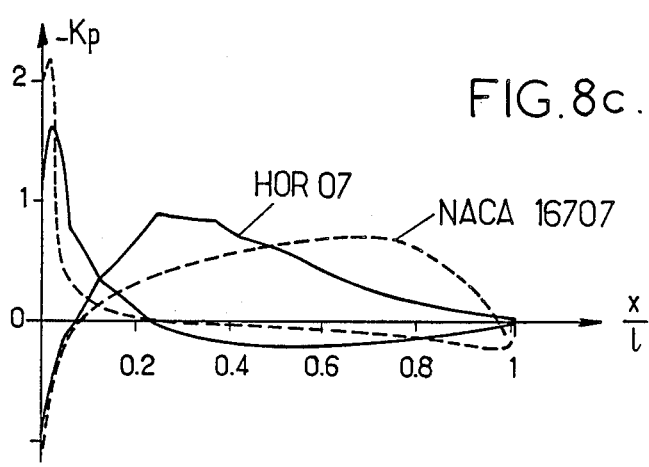
Figure 9:
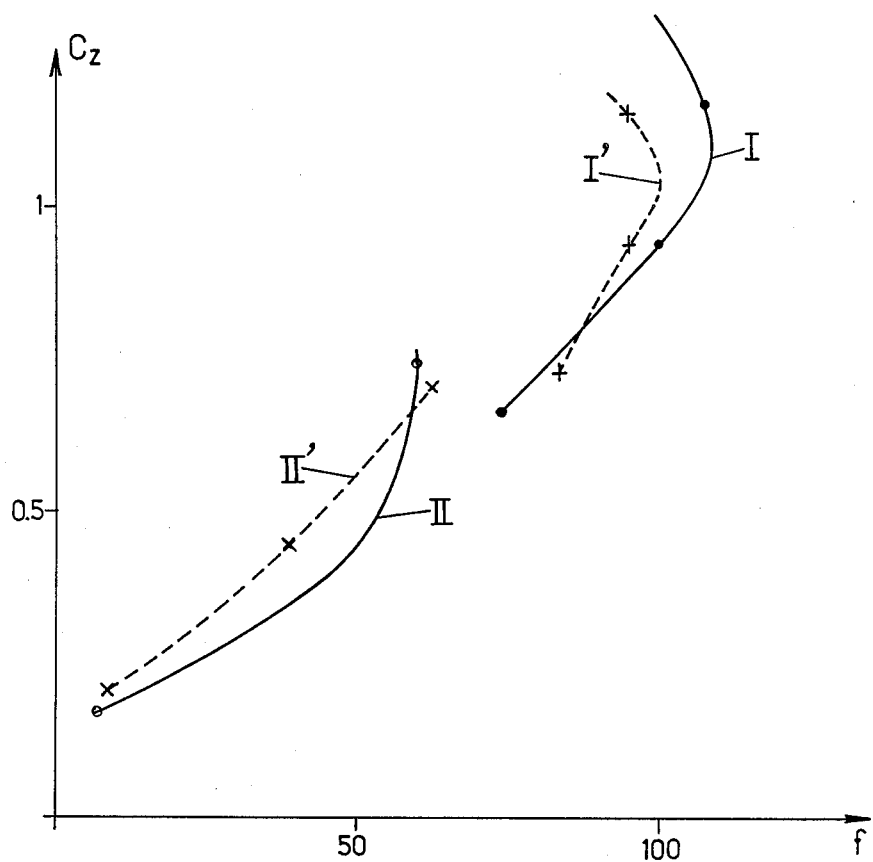
Figure 10A:
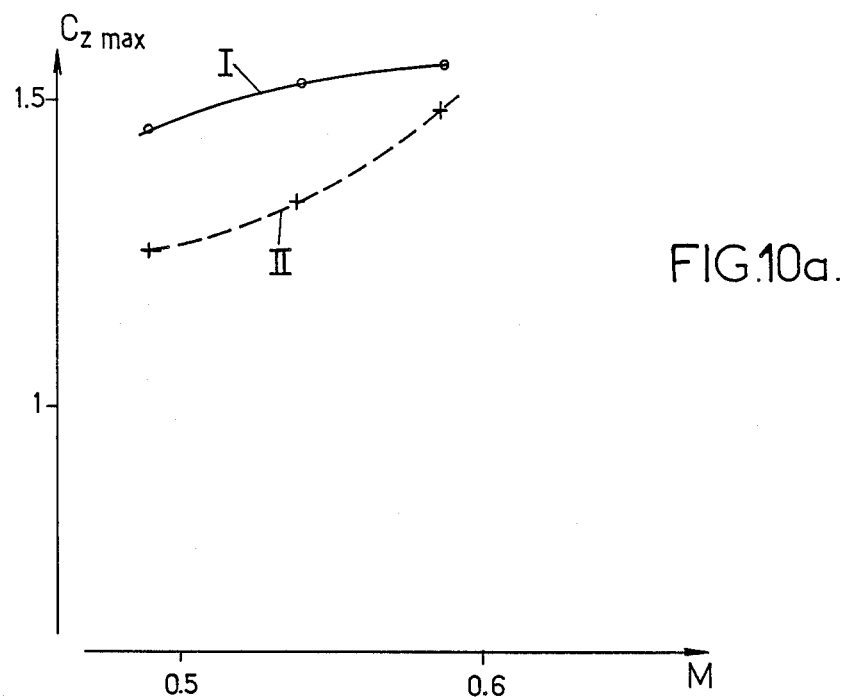
Figure 10B:
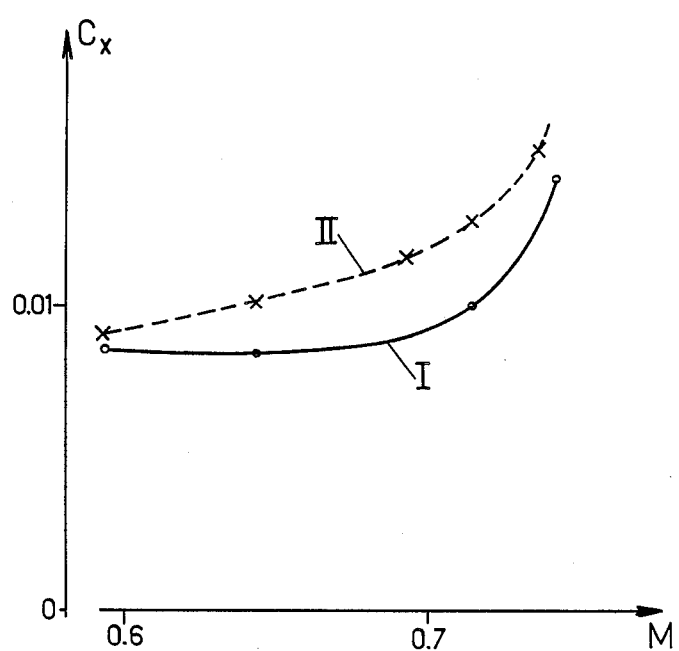

The invention will in any case be well understood from the complement of description which follows as well as from the accompanying drawings, which complement and drawings are relative to a preferred embodiment of the invention and have no limitative character:

FIG. 1 of these drawings shows a propeller blade profile formed in accordance with the invention, FIG. 2 shows the evolution of the curvatures on the extrados and the intrados of the profile of the invention as shown in FIG. 1, FIG. 3 is an enlarged view of the leading edge of the profile of the invention as shown in FIG. 1, FIG. 4 is a diagram in which are plotted the laws of thickness of four profiles of the invention having respectively relative thicknesses of 4%, 7%, 12% and 20%, FIG. 5 is a diagram in which are plotted the skeletons of four profiles of the invention having respectively relative thicknesses of 4%, 7%, 12% and 20%, FIGS. 6a, 6b, 6c, 6d show four profiles formed in accordance with the invention and having respectively relative thicknesses of 4%, 7%, 12%, and 20%, FIGS. 7a, 7b, 7c show three profiles formed in accordance with the invention and having respectively relative thicknesses of 7%, 12% and 20%, each of these three profiles being compared with known profiles, FIG. 8a is a diagram in which are plotted, on the one hand the distribution of the pressure coefficient over a profile formed in accordance with the invention and having a relative thickness of 7% and, on the other hand, the distribution of the pressure coefficient over a conventional NACA 16707 profile, for operating conditions during the take off phase, FIG. 8b is a diagram in which are plotted on the one hand the distribution of the pressure coefficient over a profile formed in accordance with the invention and having a relative thickness of 7% and, on the other hand, the distribution of a pressure coefficient over a conventional NACA 16707 profile, for operating conditions during the climbing phase, FIG. 8c is a diagram in which are plotted, on the one hand, the distribution of the pressure coefficients over a profile formed in accordance with the invention and having a relative thickness of 7%, and on the other hand, the distribution of the pressure coefficient over a conventional NACA 16707 profile, for operating conditions during the cruising phase, FIG. 9 is a diagram in which are plotted the evolutions of the lift/drag coefficient as a function of the lift coefficient under operating conditions in the climbing phase and the cruising phase, these evolutions being shown for a profile of the invention having a relative thickness of 7% and for a convention NACA 16707 profile, FIG. 10a is a diagram comprising the maximum lift coefficients of a profile of the invention having a relative thickness of 7% and of a conventional NACA 16707 profile, FIG. 10b is a diagram comprising the drag coefficients of a profile of the invention having a relative thickness of 7% and of a conventional NACA 16707 profile, FIG. 11a is a diagram illustrating the overall performances of the different profiles formed in accordance with the invention and having respectively relative thicknesses of 4%, 7%, 12% and 20% compared with the performance of a conventional NACA 16707 profile, during the take off phase, FIG. 11b is a diagram illustrating the overall performances of the different profiles formed in accordance with the invention and having respectively relative thicknesses of 4%, 7%, 12% and 20% compared with the performance of a conventional NACA 16707 profile, during the climbing phase, and FIG. 11c is a diagram illustrating the overall performances of the different profiles formed in accordance with the invention and having respectively relative thicknesses of 4%, 7%, 12% and 20% compared with the performance of a conventional NACA 16707 profile, during the cruising phase.

In FIGS. 1 and 2 has been shown a profile in accordance with the invention which has a relative thickness related to the chord between 3% and 25%. The extrados 2 of this profile has a convex shape between the leading edge A and the trailing edge F. The intrados 3 of this profile has a shape first of all convex on leaving the leading edge A, then concave on arriving at the trailing edge F.

The law of evolution of the curvatures of the extrados 2 is as follows:

the curvature, maximum at the leading edge A, decreases first of all rapidly to reach a value of about 4 at a point B situated at about 4% of the length of the chord, then, the curvature decreases regularily from point B to the trailing edge F where the value of the curvature becomes substantially zero.

The law of evolution of the curvatures of the intrados 3 is as follows:

the curvature, maximum at the leading edge A, decreases first of all rapidly to reach a value of about 8 at a point D situated at about 3.5% of the length of the chord, then the curvature decreases less rapidly to reach a zero value at a point E situated between 10% and 60% of the length of the chord, the curvature further decreases from this point of infraction E to a slightly negative value which then remains practically constant as far as the trailing edge F.

This law of evolution of the curvatures is shown in FIG. 2 on which have been plotted:

as abscissa and on the positive side the length X of the chord of the profile, represented by $(x/l)^{\frac{1}{2}}$;

as abscissa and on the negative side the length x of the chord of the profile, represented by $(x/l)^{\frac{1}{2}}$; and as ordinates the positive and negative curvature C represented by $C^{\frac{1}{2}}$.

The curve on the positive abscissa side represents the evolution of the curvatures of the extrados and the curve on the negative abscissa side represents the evolution of the curvatures of the intrados.

At the level of point B on the extrados a connection zone B'B" is provided extending over a relative distance of 2% on each side of this point B, and along which the curvature of the extrados evolves slightly (points B' and B" being then situated respectively at about 2% and at about 6% of the length of the chord).

At the level of point D on the intrados is provided a connection zone D'D" extending over a relative distance of 2% on each side of this point D, and along which the curvature of the intrados evolves slightly (the points D' and D" being then situated respectively at about 1.5% and about 5.5% of the length of the chord).

At the level of point E on the intrados a connection zone E'E" is provided extending over a relative distance of 2% on each side of this point E, and along which the curvature of the intrados evolves slightly.

Advantageously, this point E is situated at an abscissa $x$, reduced to the chord $l$, given by the formula:

$$(x/l) = 2(e/l) + 0.08.$$

As for the curvature $C_{max}$ of the profile at the leading edge A, it may be advantageously calculated by the formula:

$$C_{max} = a_1(e/l) + a_2(e/l)^2 + a_3(e/l)^3 + a_4(e/l)^4$$

in which
 e is the thickness of the profile,
 l is the chord of the profile,
 $a_1$ is a coefficient equal to $+2 \times 10^3$
 $a_2$ is a coefficient equal to $-4.576 \times 10^4$,
 $a_3$ is a coefficient equal to $+3.5 \times 10^5$,
 $a_4$ is a coefficient equal to $-8.5 \times 10^6$.

To generate profiles in accordance with the invention formulae may be used defining:
 the mean line (or skeleton) of the profile,
 the thicknesses of the profile on each side of the mean line and perpendicularly to this mean line.

For this, reference is made to the system of carthesian coordinates Ox, Oy shown in FIG. 1, and in which the chord of the profile merges with the axis Ox.

In such a system in which the abscissa $x$ and the ordinates $y$ are related to the length $l$ of the chord, the mean line and the thickness law may be represented by mathematical formulae taking into account the relative thickness ($e/l$) of a profile (e designating the thickness and $l$ the chord of the profile).

The mean line may be represented by the formula:

$$(y/l) = a_0(x/l)^{\frac{1}{2}} + a_1(x/l) + a_2(x/l)^2 + a_3(x/l)^3 + a_4(x/l)^4 + a_5(x/l)^5$$

The coefficients $a_0$, $a_1$, $a_2$, $a_3$, $a_4$ and $a_5$ have the following values in the range of relative thicknesses between 3% and 25%:

$$a_0 = 3.2056(e/l) - 110(e/l)^2 + 1018.7(e/l)^3 - 2751.7(e/l)^4$$

$$a_1 = 11.537(e/l) + 500.8(e/l)^2 - 4851.6(e/l)^3 + 13,309(e/l)^4$$

$$a_2 = 1.236(e/l) - 242.27(e/l)^2 + 2803(e/l)^3 - 8315.2(e/l)^4$$

$$a_3 = 38.5(e/l) - 1154.8(e/l)^2 + 9988.3(e/l)^3 - 25,693(e/l)^4$$

$$a_4 = -47.99(e/l) + 1547.7(e/l)^2 - 13,768(e/l)^3 + 35,952(e/l)^4$$

$$a_5 = 16.546(e/l) - 540.04(e/l)^2 + 4797.5(e/l)^3 - 12,467(e/l)^4$$

The thickness law may be represented by the formula:

$$(y/l) = b_0(x/l)^{\frac{1}{2}} + b_1(x/l) + b_2(x/l)^2 + b_3(x/l)^3 + b_4(x/l)^4 + b_5(x/l)^5$$

The coefficients $b_0$, $b_1$, $b_2$, $b_3$, $b_4$ and $b_5$ have the following values in the range of relative thicknesses between 3% and 25%:

$$b_0 = 3.476(e/l) - 59.16(e/l)^2 + 512.13(e/l)^3 - 1320.4(e/l)^4$$

$$b_1 = -12.34(e/l) + 358.32(e/l)^2 - 3097.1(e/l)^3 + 8017.9(e/l)^4$$

$$b_2 = 48.71(e/l) - 1540.2(e/l)^2 + 13202(e/l)^3 - 34,016(e/l)^4$$

$$b_3 = -101.88(e/l) + 3087.6(e/l)^2 - 2633.9(e/l)^3 + 67,587(e/l)^4$$

$$b_4 = 93,159(e/l) - 2744.7(e/l)^2 + 23,268(e/l)^3 - 59,364(e/l)^4$$

$$b_5 = -30.96(e/l) + 896.5(e/l)^2 - 7539.8(e/l)^3 + 19,093(e/l)^4$$

In FIG. 4 have been plotted the curves showing the variation of the thickness (thickness e/l related to the chord of the profile) as a function of the abscissa (abscissa x/l related to the chord of the profile).

The curves I, II, II, IV corresponding respectively to profiles of relative thicknesses 4%, 7%, 12% and 20%.

In FIG. 5 have been plotted the mean lines I, II, III, IV corresponding respectively to profiles of relative thicknesses 4%, 7%, 12% and 20%, the coordinates used in this FIG. 5 being the abscissas x/l and the ordinates y/l related to the chord of the profile.

By transferring the law of thickness on each side of the mean line and perpendicularly to the mean line, the coordinates of the profiles of the invention are obtained.

FIGS. 6a, 6b and 6c and 6d show such profiles respectively for values of the relative thickness of 4%, 7%, 12% and 20%.

In FIGS. 7a, 7b and 7c have been shown the differences which appear clearly between the profiles of the invention and conventional profiles.

In FIG. 7a has been shown with a continuous line a profile of the invention with a relative thickness of 7% and with a broken line a conventional profile of NACA 16,707 type and of the same relative thickness 7%.

In FIG. 7b has been shown with a continuous line a profile of the invention with a relative thickness of 12% and with a broken line a conventional profile of the HS1-712 type and of the same relative thickness 12%.

In FIG. 7c has been shown with a continuous line of profile of the invention with a relative thickness of 20% and with a broken line a conventional profile of the ARAD 20 type and of the same relative thickness 20%.

The evolution of the curvatures of the extrados between points A and B reduces in absolute value the minimum pressure coefficient relative to the extrados with respect to the pressure coefficient corresponding to the conventional profile of NACA 16 type.

This is shown particularly clearly in FIG. 8a in which the value x/l has been plotted as abscissa and the pressure coefficient $K_p$ as ordinates.

This Figure corresponds to the operating conditions in the take off phase, the continuous line curve corresponding to a profile of the invention of a relative thickness of 7% HOR 07 and the broken line curve to a conventional NACA 16707 profile.

The operating conditions relative to the take off phase corresponding to a Mach number close to 0.55 and to a high lift coefficient.

The connection zone B'B" in which the curvature evolves little allows an isantropic recompression phenomenon of the flow to be obtained under the same operating conditions for limiting the intensity of the shock wave at the level of the extrados and, consequently, high values to be obtained for the maximum lift coefficient.

In FIG. 8b has been shown, in the same conditions as in FIG. 8a, the evolution of the pressure coefficient under climbing operating conditions.

The evolution of the curvatures in the region of the extrados between point B and the trailing edge F allows a progressive recompression to be obtained of the flow as far as the trailing edge for all flight conditions and more particularly for climbing. This recompression is very low towards the trailing edge where the boundary layer is thick and has then a high sensitivity to the recompression phenomenon.

Such recompression avoids separation of the boundary layer and allows good values of the lift/drag coefficient to be obtained which are very advantageous in the take off and climbing phases.

FIG. 8c shows under the same conditions as in FIG. 8 the evolution of the pressure coefficient under cruising operating conditions.

The evolution of the curvatures of the intrados between points A and D allows very low values of the pressure coefficients to be obtained and, in any case, much less in absolute values than those obtained with conventional profiles.

The evolution of the curvatures of the intrados between points D and E as well as in the connection zone D' D" allows recompressions of the flow to be obtained while avoiding the appearance of shock waves.

Finally, the evolution of the curvatures of the intrados between point E and the trailing edge allows a slight acceleration of the flow to be obtained after the recompression phenomenon and this as far as the trailing edge.

The evolution of the curvatures of the intrados of the profile provides then control of the flow which gives to the profile very good lift/drag values during the cruising phase.

Comparative tests carried out under the same conditions on profiles in accordance with the invention and of relative thicknesses of 4% 7%, 12% and 20%, and on a NACA 16707 profile, have confirmed the good performances of the profiles of the invention with respect to said NACA profile.

Reference will now be made to FIG. 9 in which the lift/drag coefficient $f = C_Z/C_X$, has been shown as abscissa ($C_Z$ being the lift coefficient and $C_X$ being the drag coefficient) and as ordinates the lift coefficient $C_Z$.

In FIG. 9, the two curves I and II characterize a profile of the invention, having a relative thickness of 7%, respectively under climbing phase operating conditions (curve I) and under cruising phase operating conditions (curve II), and the two curves I' and II' characterize a NACA 16707 profile respectively under climbing phase conditions (curve I') and under cruising phase operating conditions (curve II').

In FIGS. 10a and 10b the Mach number has been plotted as abscissa and in FIG. 10a, the maximum lift coefficient $C_{Z\,max}$ and, in FIG. 10b, the drag coefficient $C_X$.

In FIG. 10a, the curve I is relative to a profile of the invention having a relative thickness of 7% and curve II is relative to an NACA 16707 profile.

In FIG. 10b the curve I is relative to a profile of the invention, with a relative thickness of 7%, and curve II is relative to an NACA 16707 profile.

In this FIG. 10b, the drag curves as a function of the Mach number are plotted for a lift coefficient of about 0.5.

In FIG. 10a, the Mach numbers are representative of those met with under the operating conditions in the take off phase and in FIG. 10b, those met with under the operating conditions in the cruising phase.

It can be seen in these Figures that the gain of the maximum lift coefficient is 15% for a Mach number of 0.55 (FIG. 10a) and that the drag coefficient is very much less than that of the NACA profile, whatever the Mach number.

In FIGS. 11a, 11b and 11c there have been plotted as abscissa the Mach number corresponding to the cruising phase, and as ordinate:

in FIG. 11a the maximum lift coefficient in the take off phase, in FIG. 11b the lift/drag coefficient in the climbing phase, and in FIG. 11c the lift/drag coefficient in the cruising phase.

In these Figures, the curves have been plotted from four operating points respectively relative to the profiles of the invention of relative thickness 4% (point HOR 0.4), 7% (point HOR 0.7), 12% (point HOR 12) and 20% (point HOR 20).

In these same Figures, the point represented by a cross corresponds to the NACA 16707 profile.

These FIGS. 11a, 11b and 11c clearly show that for all the operating conditions (take off phase, climbing phase and cruising phase) the performances of the profiles of the invention are superior to those of conventional profiles.

For generating profiles in accordance with the invention, recourse may also be had to the following coordinate tables relating to profiles of relative thickness of 4%, 7%, 12% and 20% in which are given, for the extrados and for the intrados, the coordinates related to the chord x/l and y/l (in the carthesian coordinate system Ox, Oy of FIG. 1 in which the chord merges with the axis Ox) of points situated on the extrados and on the intrados of the profiles.

Table 1 HOR 04 below is relative to a profile with relative thickness of 4%.

TABLE I

| HOR 04 | | | |
| INTRADOS | | EXTRADOS | |
| x/l | y/l | x/l | y/l |
| --- | --- | --- | --- |
| 1.00000 | −.00100 | .00460 | .00025 |
| .98000 | −.00020 | .00600 | .00354 |
| .96000 | .00060 | .00800 | .00540 |
| .94000 | .00130 | .01000 | .00680 |
| .92000 | .00200 | .01200 | .00800 |
| .90000 | .00270 | .01400 | .00897 |
| .87000 | .00330 | .01700 | .01018 |
| .84000 | .00370 | .02000 | .01122 |
| .81000 | .00400 | .02453 | .01253 |

TABLE I-continued

HOR 04

| INTRADOS | | EXTRADOS | |
|---|---|---|---|
| x/l | y/l | x/l | y/l |
| .78000 | .00410 | .02958 | .01374 |
| .75000 | .00410 | .03465 | .01480 |
| .72000 | .00400 | .03973 | .01574 |
| .69000 | .00370 | .04480 | .01661 |
| .66000 | .00330 | .04988 | .01744 |
| .63000 | .00280 | .05495 | .01822 |
| .60000 | .00220 | .06511 | .01965 |
| .57000 | .00150 | .07528 | .02097 |
| .54000 | .00080 | .08544 | .02220 |
| .51000 | −.00010 | .09560 | .02335 |
| .48000 | −.00100 | .10577 | .02443 |
| .45000 | −.00190 | .11594 | .02546 |
| .42000 | −.00280 | .12611 | .02642 |
| .39000 | −.00350 | .13628 | .02730 |
| .36000 | −.00410 | .14645 | .02810 |
| .33000 | −.00480 | .15662 | .02885 |
| .30000 | −.00530 | .16680 | .02956 |
| .28000 | −.00580 | .17697 | .03023 |
| .26000 | −.00590 | .18714 | .03085 |
| .24000 | −.00600 | .19732 | .03142 |
| .22000 | −.00610 | .20750 | .03194 |
| .20000 | −.00620 | .23294 | .03305 |
| .18000 | −.00630 | .25838 | .03390 |
| .16000 | −.00650 | .28382 | .03459 |
| .14000 | −.00660 | .30926 | .03520 |
| .12000 | −.00680 | .33469 | .03567 |
| .10000 | −.00690 | .36012 | .03602 |
| .08000 | −.00690 | .38581 | .03630 |
| .06000 | −.00680 | .41145 | .03586 |
| .05000 | −.00678 | .43670 | .03548 |
| .04500 | −.00680 | .46217 | .03509 |
| .04000 | −.00683 | .48767 | .03444 |
| .03500 | −.00684 | .51312 | .03360 |
| .03000 | −.00678 | .53854 | .03261 |
| .02500 | −.00664 | .56392 | .03152 |
| .02000 | −.00644 | .58930 | .03037 |
| .01600 | −.00613 | .62000 | .02950 |
| .01297 | −.00570 | .65000 | .02830 |
| .01000 | −.00497 | .68000 | .02680 |
| .00800 | −.00432 | .71000 | .02540 |
| .00600 | −.00292 | .74000 | .02380 |
| | | .77000 | .02210 |
| | | .80000 | .02040 |
| | | .83000 | .01870 |
| | | .86000 | .01690 |
| | | .89000 | .01500 |
| | | .92000 | .01310 |
| | | .94000 | .01170 |
| | | .96000 | .01030 |
| | | .98000 | .00890 |
| | | 1.00000 | .00800 |

Table II HOR 07 below relates to a profile with relative thickness of 7%.

TABLE II

HOR 07

| INTRADOS | | EXTRADOS | |
|---|---|---|---|
| x/l | y/l | x/l | y/l |
| 1.00000 | .00020 | .00704 | −.00026 |
| .99500 | .00060 | .01074 | .00837 |
| .99000 | .00091 | .01594 | .01394 |
| .98000 | .00160 | .02107 | .01746 |
| .96000 | .00280 | .02821 | .02141 |
| .94000 | .00410 | .03330 | .02390 |
| .92000 | .00520 | .03889 | .02648 |
| .90000 | .00670 | .04244 | .02795 |
| .87000 | .00840 | .04820 | .03025 |
| .85000 | .00960 | .05300 | .03210 |
| .83000 | .01080 | .06300 | .03564 |
| .80000 | .01240 | .07300 | .03895 |
| .76000 | .01430 | .08097 | .04147 |
| .73000 | .01570 | .09099 | .04459 |
| .70000 | .01680 | .10108 | .04755 |
| .66000 | .01810 | .11123 | .05035 |
| .63000 | .01870 | .12142 | .05299 |
| .60000 | .01900 | .13164 | .05548 |
| .56000 | .01910 | .14190 | .05782 |
| .53000 | .01900 | .15220 | .06002 |
| .50000 | .01860 | .16249 | .06206 |
| .46000 | .01750 | .17277 | .06398 |
| .43000 | .01640 | .18307 | .06577 |
| .40000 | .01510 | .19337 | .06744 |
| .38000 | .01390 | .20368 | .06900 |
| .36000 | .01280 | .22963 | .07241 |
| .34000 | .01110 | .25000 | .07440 |
| .32000 | .00960 | .30000 | .07720 |
| .30000 | .00780 | .35000 | .07820 |
| .26236 | .00437 | .40000 | .07740 |
| .23761 | .00180 | .45000 | .07530 |
| .21277 | −.00097 | .50000 | .07210 |
| .20277 | −.00211 | .55000 | .06750 |
| .19276 | −.00324 | .60000 | .06200 |
| .18274 | −.00435 | .65000 | .05580 |
| .17270 | −.00545 | .70000 | .04900 |
| .16268 | −.00654 | .75000 | .04240 |
| .15266 | −.00762 | .80000 | .03590 |
| .14261 | −.00868 | .85000 | .02920 |
| .13252 | −.00973 | .90000 | .02290 |
| .12239 | −.01075 | .92000 | .02020 |
| .11200 | −.01150 | .95000 | .01630 |
| .10200 | −.01240 | .97000 | .01370 |
| .09200 | −.01315 | .99000 | .01120 |
| .08100 | −.01362 | 1.00000 | .00995 |
| .07200 | −.01380 | | |
| .06000 | −.01380 | | |
| .05000 | −.01360 | | |
| .04000 | −.01310 | | |
| .03500 | −.01279 | | |
| .03000 | −.01225 | | |
| .02500 | −.01154 | | |
| .02000 | −.01054 | | |
| .01514 | −.00905 | | |
| .01022 | −.00657 | | |

The table III HOR 12 is relative to a profile with a relative thickness of 12%.

TABLE III

HOR 12

| INTRADOS | | EXTRADOS | |
|---|---|---|---|
| x/l | y/l | x/l | y/l |
| 1.00000 | −.00220 | 0.00000 | 0.00000 |
| .97957 | −.00014 | .002000 | .00775 |
| .95916 | .00195 | .00400 | .01160 |
| .93875 | .00395 | .00600 | .01450 |
| .91835 | .00522 | .01000 | .01925 |
| .89284 | .00642 | .01400 | .02320 |
| .86734 | .00726 | .01800 | .02650 |
| .84183 | .00788 | .02200 | .02935 |
| .81636 | .00825 | .02659 | .03240 |
| .79094 | .00831 | .03114 | .03541 |
| .76549 | .00807 | .03574 | .03814 |
| .74001 | .00762 | .04039 | .04069 |
| .71454 | .00704 | .04507 | .04315 |
| .68908 | .00634 | .04980 | .04551 |
| .66365 | .00552 | .05937 | .04992 |
| .63829 | .00456 | .06909 | .05401 |
| .61297 | .00343 | .07900 | .05780 |
| .58767 | .00214 | .08901 | .06132 |
| .56246 | .00068 | .09911 | .06459 |
| .53736 | −.00099 | .10928 | .06761 |
| .51235 | −.00292 | .11949 | .07040 |
| .48764 | −.00514 | .12975 | .07299 |
| .46245 | −.00761 | .14007 | .07538 |
| .43755 | −.01022 | .15044 | .07758 |
| .41263 | −.01292 | .16078 | .07958 |
| .38768 | −.01563 | .17110 | .08142 |
| .36272 | −.01830 | .18146 | .08310 |
| .33738 | −.02087 | .19181 | .08463 |
| .31296 | −.02336 | .20219 | .08601 |
| .28805 | −.02564 | .22835 | .08886 |

TABLE III-continued
HOR 12

| INTRADOS | | EXTRADOS | |
|---|---|---|---|
| x/l | y/l | x/l | y/l |
| .26330 | −.02773 | .25471 | .09092 |
| .23887 | −.02976 | .28074 | .09223 |
| .21424 | −.03176 | .30662 | .09289 |
| .20432 | −.03250 | .33248 | .09301 |
| .19435 | −.03319 | .35843 | .09260 |
| .18439 | −.03381 | .38425 | .09173 |
| .17440 | −.03435 | .41009 | .09045 |
| .16443 | −.03482 | .43595 | .08880 |
| .15448 | −.03522 | .46183 | .08677 |
| .14448 | −.03553 | .48743 | .08446 |
| .13443 | −.03575 | .51351 | .08187 |
| .12433 | −.03586 | .53928 | .07897 |
| .11419 | −.03584 | .56497 | .07584 |
| .10397 | −.03566 | .59054 | .07249 |
| .09367 | −.03531 | .61603 | .06898 |
| .08326 | −.03475 | .64149 | .06533 |
| .07268 | −.03390 | .66691 | .06154 |
| .06193 | −.03268 | .69227 | .05766 |
| .05650 | −.03188 | .71760 | .05372 |
| .05103 | −.03095 | .74293 | .04972 |
| .04552 | −.02989 | .76821 | .04571 |
| .03996 | −.02859 | .79355 | .04166 |
| .03435 | −.02695 | .81891 | .03753 |
| .02873 | −.02507 | .84423 | .03328 |
| .02084 | −.02248 | .86950 | .02896 |
| .01400 | −.01910 | .89478 | .02460 |
| .01000 | −.01640 | .92007 | .02015 |
| .00600 | −.01280 | .94029 | .01655 |
| .00400 | −.01045 | .96051 | .01340 |
| .00200 | −.00680 | .98073 | .01015 |
| | | 1.00092 | .00680 |

The table IV HOR 20 is relative to a profile with a relative thickness of 20%.

TABLE IV
HOR 20

| INTRADOS | | EXTRADOS | |
|---|---|---|---|
| x/l | y/l | x/l | y/l |
| 1.00000 | .00350 | 0.00000 | .00900 |
| .97000 | .00255 | .00200 | .01970 |
| .95000 | .00195 | .00500 | .02820 |
| .93000 | .00130 | .00700 | .03220 |
| .91000 | .00080 | .01000 | .03730 |
| .89266 | .00002 | .01500 | .04430 |
| .86704 | −.00049 | .02000 | .04990 |
| .84147 | −.00126 | .02500 | .05510 |
| .81598 | −.00237 | .03000 | .05980 |
| .79051 | −.00386 | .04135 | .06932 |
| .76497 | −.00567 | .05497 | .07913 |
| .73942 | −.00771 | .06437 | .08492 |
| .71388 | −.00990 | .07403 | .09022 |
| .68838 | −.01222 | .08389 | .09510 |
| .66297 | −.01469 | .09391 | .09958 |
| .63766 | −.01733 | .10405 | .10371 |
| .61238 | −.02013 | .11428 | .10747 |
| .58719 | −.02311 | .12460 | .11092 |
| .56219 | −.02627 | .13501 | .11409 |
| .53732 | −.02966 | .14550 | .11696 |
| .51279 | −.03335 | .15598 | .11956 |
| .48819 | −.03736 | .16643 | .12190 |
| .46323 | −.04148 | .17692 | .12402 |
| .43864 | −.04568 | .18741 | .12589 |
| .41400 | −.04984 | .19794 | .12755 |
| .38933 | −.05387 | .22463 | .13086 |
| .36468 | −.05768 | .25152 | .13308 |
| .34020 | −.06121 | .27823 | .13430 |
| .31555 | −.06443 | .30446 | .13457 |
| .29096 | −.06717 | .33063 | .13403 |
| .26685 | −.06946 | .35696 | .13276 |
| .24292 | −.07146 | .38314 | .13083 |
| .21879 | −.07310 | .40929 | .12833 |
| .20899 | −.07359 | .43547 | .12532 |
| .19915 | −.07395 | .46170 | .12183 |
| .18931 | −.07417 | .48756 | .11797 |
| .17943 | −.07424 | .51378 | .11394 |

TABLE IV-continued
HOR 20

| INTRADOS | | EXTRADOS | |
|---|---|---|---|
| x/l | y/l | x/l | y/l |
| .16958 | −.07415 | .54007 | .10956 |
| .15974 | −.07389 | .56602 | .10492 |
| .14983 | −.07346 | .59184 | .10005 |
| .13982 | −.07284 | .61747 | .09499 |
| .12972 | −.07200 | .64302 | .08978 |
| .11954 | −.07089 | .66853 | .08444 |
| .10923 | −.06950 | .69393 | .07899 |
| .09876 | −.06778 | .71925 | .07349 |
| .08809 | −.06567 | .74454 | .06794 |
| .07717 | −.06308 | .76980 | .06238 |
| .06597 | −.05985 | .79509 | .05686 |
| .06029 | −.05793 | .82044 | .05136 |
| .05456 | −.05580 | .84577 | .04582 |
| .04876 | −.05346 | .87101 | .04024 |
| .04285 | −.05072 | .89621 | .03465 |
| .03688 | −.04742 | .92146 | .02911 |
| .03000 | −.04340 | .94165 | .02461 |
| .02500 | −.03980 | .96186 | .02040 |
| .02000 | −.03590 | .98000 | .01690 |
| .01500 | −.03130 | 1.00000 | .01250 |
| .01000 | −.02550 | | |
| .00500 | −.01740 | | |
| .00200 | −.01000 | | |

In so far as the propeller is concerned formed using the profiles of the invention, it should be pointed out that it is not indispensable, for obtaining the favorable effects mentioned above, for the whole of the blade of the propeller to have a profile of the invention.

Advantageously, it is the external part of the blade which will have the profile of the invention.

Preferably, for a blade having a span of R, the profiles of the blade between 0.2 R and R will be formed in accordance with the invention.

Examples of embodiments of propellers provided with blades in accordance with the invention are given hereinafter.

With the geometry of the complete blade defined as was mentioned above, only the particular points of the relative thickness law will be mentioned as a function of the length (R) of the blade when this latter has a profile in accordance with the invention, for three cases of application.

EXAMPLE 1

Aircraft Propeller

Propeller with 4 blades, of 5.50 m in diameter, of a power of 4300 kW at 976 rpm. The blade having the following profiles:

at the root, a connection profile derived from the NACA 64 profile,
at 0.24 R a profile HOR 20,
at 0.40 R a profile HOR 12,
at 0.65 R a profile HOR 07,
at 0.90 R a profile HOR 04.

EXAMPLE 2

Aircraft Propeller

Propeller with 3 blades, of 2.30 m in diameter, of a power of 400 kW at 2377 rpm.

The blade has the following profiles:

at the root, a connection profile derived from the NACA 64 profile,
at 0.30 R a profile HOR 20,
at 0.45 R a profile HOR 12,
at 0.60 R a profile HOR 07, at 0.84 R a profile HOR 04.

EXAMPLE 3

Propeller for a wind engine

Propeller with 2 blades, of 18 m in diameter, of a power of 100 kW for a wind speed of 12 meters/second.

The blade has the following profiles:
at the root, a connection profile derived from the profile HOR 20,
at 0.25 R a profile HOR 20,
at 0.70 R a profile HOR 12.

We claim:

1. A propeller blade having a profile whose relative thickness is comprised between 3% and 25%, whose extrados has a convex shape between the leading edge and the trailing edge and whose intrados has a shape first of all convex on leaving the leading edge then concave on arriving at the trailing edge, characterized by the following values of the curvatures on the extrados: the curvature, maximum at the leading edge, decreases first of all rapidly to reach a value of about 4 at about 4% of the length of the chord and then decreases regularly to reach a substantially zero value at the trailing edge; and by the following values of the curvatures on the intrados the curvature, maximum at the leading edge, decreases first of all rapidly to reach a value of about 8 to about 3.5% of the length of the chord, then decreases less rapidly to reach a zero value at a point situated between 10% and 60% of the length of the chord, further decreases to a slightly negative value, and then remains practically constant as far as the trailing edge.

2. A propeller according to claim 1, characterized by the fact that on each side of the point at 4% of the length of the chord, over a relative distance of 2% on each side of this point, the curvature of the extrados evolves very slightly.

3. A propeller according to claim 1, characterized by the fact that on each side of the point at 3.5% of the length of the chord, over a relative distance of 2% on each side of this point, the curvature of the intrados evolves very slightly.

4. A propeller according to claim 1, characterized by the fact that on each side of the point of the chord where the curvature of the intrados is zero, over a relative distance of 2% on each side of this point, the curvature of the intrados evolves very slightly.

5. A propeller according to claim 1, characterized by the fact that the curvature $C_{max}$ at the leading edge is given by the formula:

$$C_{max} = a_1(e/l) + a_2(e/l)^2 + a_3(e/l)^3 + a_4(e/l)^4$$

e being the thickness of the profile,
l being the chord of the profile,
$a_1$ being a coefficient equal to $+2 \times 10^3$,
$a_2$ being a coefficient equal to $-4.576 \times 10^4$,
$a_3$ being a coefficient equal to $+3.5 \times 10^5$,
$a_4$ being a coefficient equal to $-8.5 \times 10^6$.

6. A propeller according to claim 1, characterized by the fact that the point of the chord where the curvature of the intrados is zero has an abscissa X, reduced to the chord A, given by the formula:

$$(x/l) = 2(e/l) + 0.08$$

e being the thickness of the profile,
l being the chord of the profile.

7. Profile according to claim 1, characterized by the fact that the mean line of the profile is represented by the formula:

$$(y/l) = a_0(x/l)^{\frac{1}{2}} + a_1(x/l) + a_2(x/l)^2 + a_3(x/l)^3 + a_4(x/l)^4 + a_5(x/l)^5$$

in which the coefficients $a_0 = 3.2056(e/l) - 110(e/l)^2 + 1018.7(e/l)^3 - 2751.7(e/l)^4$ $a_1 = -11.537(e/l) + 500.8(e/l)^2 - 4851.6(e/l)^3 + 13,309(e/l)^4$ $a_2 = 1.236(e/l) - 242.27(e/l)^2 + 2803(e/l)^3 - 8315.2(e/l)^4$ $a_3 = 38.5(e/l) - 1154.8(e/l)^2 + 9988.3(e/l)^3 - 2569.3(e/l)^4$ $a_4 = -47.99(e/l) + 1547.7(e/l)^2 - 13768(e/l)^3 + 35,952(e/l)^4$ $a_5 = 16.546(e/l) - 540.04(e/l)^2 + 4797.5(e/l)^3 - 12,467(e/l)^4$ and by the fact that the law of thickness is represented by the formula:

$$(y/l) = b_0(x/l)^{\frac{1}{2}} + b_1(x/l) + b_2(x/l)^2 + b_3(x/l)^3 + b_4(x/l)^4 + b_5(x/l)^5$$

in which the coefficients:

$b_0 = 3.476(e/l) - 59.16(e/l)^2 + 512.13(e/l)^3 - 1320.4(e/l)^4$ $b_1 - 12.34(e/l) + 358.32(e/l)^2 - 3097.1(e/l)^3 + 8017.9(e/l)^4$ $b_2 = 48.71(e/l) - 1540.2(e/l)^2 + 13,202(e/l)^3 - 34,016(e/l)^4$ $b_3 = -101.88(e/l) + 3087.6(e/l)^2 - 26,339(e/l)^3 + 67,587(e/l)^4$ $b_4 = 93,159(e/l) - 2744.7(e/l)^2 + 23,268(e/l)^3 - 59,364(e/l)^4$ $b_5 = -30.96(e/l) + 896.5(e/l)^2 - 7539.8(e/l)^3 + 19,093(e/l)^4$.

8. A propeller according to claim 1, having a relative thickness of 4%, characterized by the fact that it is determined by the coefficients x/l and y/l for the intrados and the extrados given below:

| HOR 04 | | | |
|---|---|---|---|
| INTRADOS | | EXTRADOS | |
| x/l | y/l | x/l | y/l |
| 1.00000 | −.00100 | .00460 | .00025 |
| .98000 | −.00020 | .00600 | .00354 |
| .96000 | .00060 | .00800 | .00540 |
| .94000 | .00130 | .01000 | .00680 |
| .92000 | .00200 | .01200 | .00800 |
| .90000 | .00270 | .01400 | .00897 |
| .87000 | .00330 | .01700 | .01018 |
| .84000 | .00370 | .02000 | .01122 |
| .81000 | .00400 | .02453 | .01253 |
| .78000 | .00410 | .02958 | .01374 |
| .75000 | .00410 | .03465 | .01480 |
| .72000 | .00400 | .03973 | .01574 |
| .69000 | .00370 | .04480 | .01661 |
| .66000 | .00330 | .04988 | .01744 |
| .63000 | .00280 | .05495 | .01822 |
| .60000 | .00220 | .06511 | .01965 |
| .57000 | .00150 | .07528 | .02097 |
| .54000 | .00080 | .08544 | .02220 |
| .51000 | −.00010 | .09560 | .02335 |

-continued

| HOR 04 | | | |
|---|---|---|---|
| INTRADOS | | EXTRADOS | |
| x/l | y/l | x/l | y/l |
| .48000 | −.00100 | .10577 | .02443 |
| .45000 | −.00190 | .11594 | .02546 |
| .42000 | −.00280 | .12611 | .02642 |
| .39000 | −.00350 | .13628 | .02730 |
| .36000 | −.00410 | .14645 | .02810 |
| .33000 | −.00480 | .15662 | .02885 |
| .30000 | −.00530 | .16680 | .02956 |
| .28000 | −.00580 | .17697 | .03023 |
| .26000 | −.00590 | .18714 | .03085 |
| .24000 | −.00600 | .19732 | .03142 |
| .22000 | −.00610 | .20750 | .03194 |
| .20000 | −.00620 | .23294 | .03305 |
| .18000 | −.00630 | .25838 | .03390 |
| .16000 | −.00650 | .28382 | .03459 |
| .14000 | −.00660 | .30926 | .03520 |
| .12000 | −.00680 | .33469 | .03567 |
| .10000 | −.00690 | .36012 | .03602 |
| .08000 | −.00690 | .38581 | .03630 |
| .06000 | −.00680 | .41145 | .03586 |
| .05000 | −.00678 | .43670 | .03548 |
| .04500 | −.00680 | .46217 | .03509 |
| .04000 | −.00683 | .48767 | .03444 |
| .03500 | −.00684 | .51312 | .03360 |
| .03000 | −.00678 | .53854 | .03261 |
| .02500 | −.00664 | .56392 | .03152 |
| .02000 | −.00644 | .58930 | .03037 |
| .01600 | −.00613 | .62000 | .02950 |
| .01297 | −.00570 | .65000 | .02830 |
| .01000 | −.00497 | .68000 | .02680 |
| .00800 | −.00432 | .71000 | .02540 |
| .00600 | −.00292 | .74000 | .02380 |
| | | .77000 | .02210 |
| | | .80000 | .02040 |
| | | .83000 | .01870 |
| | | .86000 | .01690 |
| | | .89000 | .01500 |
| | | .92000 | .01310 |
| | | .94000 | .01170 |
| | | .96000 | .01030 |
| | | .98000 | .00890 |
| | | 1.00000 | .00800 |

9. A propeller according to claim 1, having a relative thickness of 7%, characterized by the fact that it is determined by the coefficients x/l and y/l for the intrados and extrados given below:

| HOR 07 | | | |
|---|---|---|---|
| INTRADOS | | EXTRADOS | |
| x/l | y/l | x/l | y/l |
| 1.00000 | .00020 | .00704 | −.00026 |
| .99500 | .00060 | .01074 | .00837 |
| .99000 | .00091 | .01594 | .01394 |
| .98000 | .00160 | .02107 | .01746 |
| .96000 | .00280 | .02821 | .02141 |
| .94000 | .00410 | .03330 | .02390 |
| .92000 | .00520 | .03889 | .02648 |
| .90000 | .00670 | .04244 | .02795 |
| .87000 | .00840 | .04820 | .03025 |
| .85000 | .00960 | .05300 | .03210 |
| .83000 | .01080 | .06300 | .03564 |
| .80000 | .01240 | .07300 | .03895 |
| .76000 | .01430 | .08097 | .04147 |
| .73000 | .01570 | .09099 | .04459 |
| .70000 | .01680 | .10108 | .04755 |
| .66000 | .01810 | .11123 | .05035 |
| .63000 | .01870 | .12142 | .05299 |
| .60000 | .01900 | .13164 | .05548 |
| .56000 | .01910 | .14190 | .05782 |
| .53000 | .01900 | .15220 | .06002 |
| .50000 | .01860 | .16249 | .06206 |
| .46000 | .01750 | .17277 | .06398 |
| .43000 | .01640 | .18307 | .06577 |
| .40000 | .01510 | .19337 | .06744 |

-continued

| HOR 07 | | | |
|---|---|---|---|
| INTRADOS | | EXTRADOS | |
| x/l | y/l | x/l | y/l |
| .38000 | .01390 | .20368 | .06900 |
| .36000 | .01280 | .22963 | .07241 |
| .34000 | .01110 | .25000 | .07440 |
| .32000 | .00960 | .30000 | .07720 |
| .30000 | .00780 | .35000 | .07820 |
| .26236 | .00437 | .40000 | .07740 |
| .23761 | .00180 | .45000 | .07530 |
| .21277 | −.00097 | .50000 | .07210 |
| .20277 | −.00211 | .55000 | .06750 |
| .19276 | −.00324 | .60000 | .06200 |
| .18274 | −.00435 | .65000 | .05580 |
| .17270 | −.00545 | .70000 | .04900 |
| .16268 | −.00654 | .75000 | .04240 |
| .15266 | −.00762 | .80000 | .03590 |
| .14261 | −.00868 | .85000 | .02920 |
| .13252 | −.00973 | .90000 | .02290 |
| .12239 | −.01075 | .92000 | .02020 |
| .11200 | −.01150 | .95000 | .01630 |
| .10200 | −.01240 | .97000 | .01370 |
| .09200 | −.01315 | .99000 | .01120 |
| .08100 | −.01362 | 1.00000 | .00995 |
| .07200 | −.01380 | | |
| .06000 | −.01380 | | |
| .05000 | −.01360 | | |
| .04000 | −.01310 | | |
| .03500 | −.01279 | | |
| .03000 | −.01225 | | |
| .02500 | −.01154 | | |
| .02000 | −.01054 | | |
| .01514 | −.00905 | | |
| .01022 | −.00657 | | |

10. A propeller according to claim 1, having a relative thickness of 12%, characterized by the fact that it is determined by the coefficients x/l and y/l for the intrados and the extrados given below:

| HOR 12 | | | |
|---|---|---|---|
| INTRADOS | | EXTRADOS | |
| x/l | y/l | x/l | y/l |
| 1.00000 | −.00220 | 0.00000 | 0.00000 |
| .97957 | −.00014 | .00200 | .00775 |
| .95916 | .00195 | .00400 | .01160 |
| .93875 | .00395 | .00600 | .01450 |
| .91835 | .00522 | .01000 | .01925 |
| .89284 | .00642 | .01400 | .02320 |
| .86734 | .00726 | .01800 | .02650 |
| .84183 | .00788 | .02200 | .02935 |
| .81636 | .00825 | .02659 | .03240 |
| .79094 | .00831 | .03114 | .03541 |
| .76549 | .00807 | .03574 | .03814 |
| .74001 | .00762 | .04039 | .04069 |
| .71454 | .00704 | .04507 | .04315 |
| .68908 | .00634 | .04980 | .04551 |
| .66365 | .00552 | .05937 | .04992 |
| .63829 | .00456 | .06909 | .05401 |
| .61297 | .00343 | .07900 | .05780 |
| .58767 | .00214 | .08901 | .06132 |
| .56246 | .00068 | .09911 | .06459 |
| .53736 | −.00099 | .10928 | .06761 |
| .51235 | −.00292 | .11949 | .07040 |
| .48764 | −.00514 | .12975 | .07299 |
| .46245 | −.00761 | .14007 | .07538 |
| .43755 | −.01022 | .15044 | .07758 |
| .41263 | −.01292 | .16078 | .07958 |
| .38768 | −.01563 | .17110 | .08142 |
| .36272 | −.01830 | .18146 | .08310 |
| .33738 | −.02087 | .19181 | .08463 |
| .31296 | −.02336 | .20219 | .08601 |
| .28805 | −.02564 | .22835 | .08886 |
| .26330 | −.02773 | .25471 | .09092 |
| .23887 | −.02976 | .28074 | .09223 |
| .21424 | −.03176 | .30662 | .09289 |
| .20432 | −.03250 | .33248 | .09301 |

-continued

HOR 12

| INTRADOS | | EXTRADOS | |
|---|---|---|---|
| x/l | y/l | x/l | y/l |
| .19435 | −.03319 | .35843 | .09260 |
| .18439 | −.03381 | .38425 | .09173 |
| .17440 | −.03435 | .41009 | .09045 |
| .16443 | −.03482 | .43595 | .08880 |
| .15448 | −.03522 | .46183 | .08677 |
| .14448 | −.03553 | .48743 | .08446 |
| .13443 | −.03575 | .51351 | .08187 |
| .12433 | −.03586 | .53928 | .07897 |
| .11419 | −.03584 | .56497 | .07584 |
| .10397 | −.03566 | .59054 | .07249 |
| .09367 | −.03531 | .61603 | .06898 |
| .08326 | −.03475 | .64149 | .06533 |
| .07268 | −.03390 | .66691 | .06154 |
| .06193 | −.03268 | .69227 | .05766 |
| .05650 | −.03188 | .71760 | .05372 |
| .05103 | −.03095 | .74290 | .04972 |
| .04552 | −.02989 | .76821 | .04571 |
| .03996 | −.02859 | .79355 | .04166 |
| .03435 | −.02695 | .81891 | .03753 |
| .02873 | −.02507 | .84423 | .03328 |
| .02084 | −.02248 | .86950 | .02896 |
| .01400 | −.01910 | .89478 | .02460 |
| .01000 | −.01640 | .92007 | .02015 |
| .00600 | −.01280 | .94029 | .01655 |
| .00400 | −.01045 | .96051 | .01340 |
| .00200 | −.00680 | .98073 | .01015 |
| | | 1.00092 | .00680 |

11. A propeller according to claim 1, having a relative thickness of 20%, characterized by the fact that it is determined by the coefficients x/l and y/l for the intrados and the extrados given below:

HOR 20

| INTRADOS | | EXTRADOS | |
|---|---|---|---|
| x/l | y/l | x/l | y/l |
| 1.00000 | .00350 | 0.00000 | .00900 |
| .97000 | .00255 | .00200 | .01970 |
| .95000 | .00195 | .00500 | .02820 |
| .93000 | .00130 | .00700 | .03220 |
| .91000 | .00080 | .01000 | .03730 |
| .89266 | .00002 | .01500 | .04430 |
| .86704 | −.00049 | .02000 | .04990 |
| .84147 | −.00126 | .02500 | .05510 |
| .81598 | −.00237 | .03000 | .05980 |
| .79051 | −.00386 | .04135 | .06932 |
| .76497 | −.00567 | .05497 | .07913 |
| .73942 | −.00771 | .06437 | .08492 |
| .71388 | −.00990 | .07403 | .09022 |
| .68838 | −.01222 | .08389 | .09510 |
| .66297 | −.01469 | .09391 | .09958 |
| .63766 | −.01733 | .10405 | .10371 |
| .61238 | −.02013 | .11428 | .10747 |

-continued

HOR 20

| INTRADOS | | EXTRADOS | |
|---|---|---|---|
| x/l | y/l | x/l | y/l |
| .58719 | −.02311 | .12460 | .11092 |
| .56219 | −.02627 | .13501 | .11409 |
| .53732 | −.02966 | .14550 | .11696 |
| .51279 | −.03335 | .15598 | .11956 |
| .48819 | −.03736 | .16643 | .12190 |
| .46323 | −.04148 | .17692 | .12402 |
| .43864 | −.04568 | .18741 | .12589 |
| .41400 | −.04984 | .19794 | .12755 |
| .38933 | −.05387 | .22463 | .13086 |
| .36468 | −.05768 | .25152 | .13308 |
| .34020 | −.06121 | .27823 | .13430 |
| .31555 | −.06443 | .30446 | .13457 |
| .29096 | −.06717 | .33063 | .13403 |
| .26685 | −.06946 | .35696 | .13276 |
| .24292 | −.07146 | .38314 | .13083 |
| .21879 | −.07310 | .40929 | .12833 |
| .20899 | −.07359 | .43547 | .12532 |
| .19915 | −.07395 | .46170 | .12183 |
| .18931 | −.07417 | .48756 | .11797 |
| .17943 | −.07424 | .51378 | .11394 |
| .16958 | −.07415 | .54007 | .10956 |
| .15974 | −.07389 | .56602 | .10492 |
| .14983 | −.07346 | .59184 | .10005 |
| .13982 | −.07284 | .61747 | .09499 |
| .12972 | −.07200 | .64302 | .08978 |
| .11954 | −.07089 | .66853 | .08444 |
| .10923 | −.06950 | .69393 | .07899 |
| .09876 | −.06778 | .71925 | .07349 |
| .08809 | −.06567 | .74454 | .06794 |
| .07717 | −.06308 | .76980 | .06238 |
| .06597 | −.05985 | .79509 | .05686 |
| .06029 | −.05793 | .82044 | .05136 |
| .05456 | −.05580 | .84577 | .04582 |
| .04876 | −.05346 | .87101 | .04024 |
| .04285 | −.05072 | .89621 | .03465 |
| .03688 | −.04742 | .92146 | .02911 |
| .03000 | −.04340 | .94165 | .02461 |
| .02500 | −.03980 | .96186 | .02040 |
| .02000 | −.03590 | .98000 | .01690 |
| .01500 | −.03130 | 1.00000 | .01250 |
| .01000 | −.02550 | | |
| .00500 | −.01740 | | |
| .00200 | −.01000 | | |

12. A propeller according to claim 1, having blades of span R, characterized by the fact that the profiles of each blade between 0.2 R and R are formed in accordance with claim 1.

13. A propeller according to claim 12, characterized by the fact that each blade comprises:
   between 0.20 R and 0.35 R a profile HOR 20; and
   between 0.65 R and 0.75 R a profile HOR 12.

14. A propeller according to claim 12, characterized by the fact that each blade comprises:
   between 0.20 R and 0.35 R a profile HOR 20;
   between 0.35 R and 0.75 R a profile HOR 12;
   between 0.55 R and 0.70 R a profile HOR 07; and
   between 0.80 R and 0.95 R a profile HOR 04.

* * * * *

UNITED STATES PATENT AND TRADEMARK OFFICE
CERTIFICATE OF CORRECTION

PATENT NO. : 4,773,825

DATED : September 27, 1988

INVENTOR(S) : RODDE, Anne M. and THIBERT, Jean J.

It is certified that error appears in the above-identified patent and that said Letters Patent are hereby corrected as shown below:

On the title page assignee should read

-- [73] Assignee: Office National D'Etudes et de Recherche Aerospatiales (ONERA), Chatillon Sous Bagneux, France and Ratier Figeac, Figeac, France --

Signed and Sealed this

Eleventh Day of April, 1989

Attest:

DONALD J. QUIGG

Attesting Officer

Commissioner of Patents and Trademarks